(No Model.)

F. T. GANDY.
HARROW.

No. 284,832. Patented Sept. 11, 1883.

WITNESSES:

INVENTOR:
F. T. Gandy
BY Munn & Co.
ATTORNEYS.

UNITED STATES PATENT OFFICE.

FELIX T. GANDY, OF RUBENS, KANSAS.

HARROW.

SPECIFICATION forming part of Letters Patent No. 284,832, dated September 11, 1883.

Application filed May 5, 1883. (No model.)

*To all whom it may concern:*

Be it known that I, FELIX T. GANDY, of Rubens, Jewell county, State of Kansas, have invented a new and Improved Harrow, of which the following is a full, clear, and exact description.

My invention consists of an improved contrivance of harrows adapted for all ordinary work, so as to be also readily adapted for cultivating "listed" corn—that is to say, corn planted in furrows between ridges—in which it is desirable to have the harrow capable of adjustment on a central pivot, so as to dress the two sloping sides of the furrow, and also so as to be able to vary the angles of the two sides of the harrow, so that in the first dressing, when the corn is low, the harrow may run deeper in the furrow, and afterward may run less deep therein when the corn has grown higher, all as hereinafter fully described.

Reference is to be had to the accompanying drawings, forming part of this specification, in which similar letters of reference indicate corresponding parts in both figures.

Figure 1:
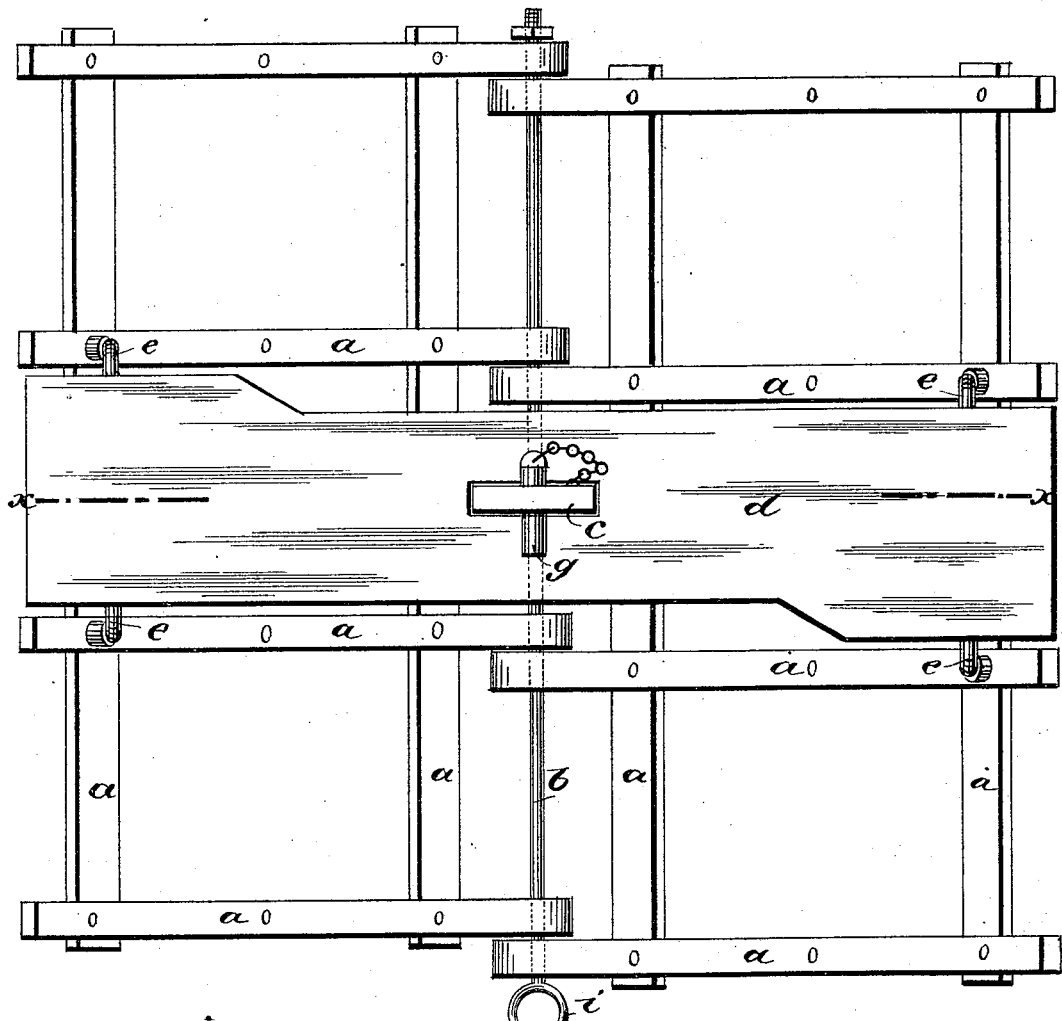
Figure 2:
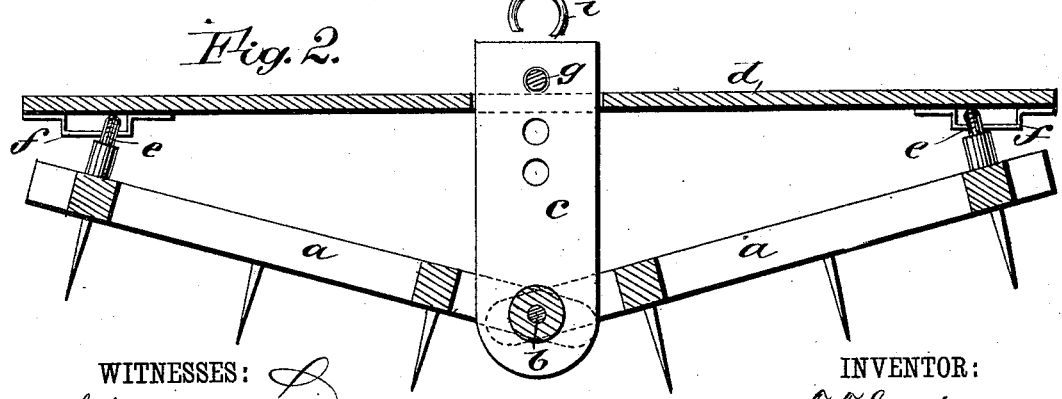

Figure 1 is a plan view of my improved cultivator. Fig. 2 is a transverse section of Fig. 1 on the line $x\ x$.

My invention consists of jointing two sections of any ordinary harrow, $a$, together at one side, on a central shaft, $b$, longitudinally, so as to allow the respective parts or sections to turn on said shaft, either for raising or depressing the center, and providing the upright $c$ and the cross-bar $d$ to limit the depression of the center of the harrow for running in and cultivating the sloping sides of furrows in which the corn is planted along the bottom, over which it is desirable to have the depressed center of the harrow run sufficiently above the corn to prevent injury to it, the harrow being so that the depression of the center may be varied according to the height of the corn. The bar $d$ is connected to the sections $a$ at their outer sides by the yokes $e$ and clips $f$, allowing the requisite play to enable the center to be depressed as much as may be required; and the upright $c$ is pivoted to the shaft $b$, and extended up through a slot in the cross-bar $d$, to receive a pin, $g$, over the cross-bar, which suspends the center of the harrow from the cross-bar, where the ends of the cross-bar have support on the yokes $e$, by reason of the outer portions of the sections running high upon the sloping sides of the furrow.

The upright $c$ has a series of holes for the pin to enable the angle of the harrow to be altered at will, as the depth of the furrow and the height of the corn may require. It will be seen that this contrivance enables the harrow to automatically assume a level for ordinary work on level ground, as well as the angular condition for working in furrows. As the two sections together are not to be wider than the space between the rows of corn, it will be seen that one horse may easily draw two harrows, and two horses may draw three side by side by suitably hitching the horses to them. For instance, a single horse may be hitched to an evener having its ends connected to the middle of each wing of the two harrows, respectively, and the horse will travel along the crest of the ridge between the rows of corn. Two horses similarly traveling along the crests of two parallel ridges may be hitched to an evener having a gang consisting of three of these harrows hitched to it.

Having thus described my invention, I claim as new and desire to secure by Letters Patent—

1. The combination, with a cross-bar having a hole in its center, of two harrows loosely hung at their outer edges to the two ends of said bar to swing under it, a central shaft passing through the inner edges of the harrows, an upright hanger passing through said hole in the cross-bar attached to said shaft, and having cross-holes through it, and a pin to fit said holes, as shown and described.

2. The cross-bar $d$, upright $c$, and fastening-pin $g$, in combination with a harrow of two sections pivoted on a central shaft, $b$, said bar being connected to the outer sides of said sections by yokes $e$ and clips $f$, substantially as described.

FELIX T. GANDY.

Witnesses:
J. W. McROBERTS, Jr.,
O. L. McCLUNG.